United States Patent [19]

Pawelzik et al.

[11] Patent Number: 5,190,077
[45] Date of Patent: Mar. 2, 1993

[54] SWITCHOVER VALVE

[75] Inventors: Manfred Pawelzik, Soest; Kerstin Polhaus, Hagen, both of Fed. Rep. of Germany

[73] Assignee: Friedrich Grohe Armaturenfabrik GmbH & Co., Hemer, Fed. Rep. of Germany

[21] Appl. No.: 783,630

[22] Filed: Oct. 25, 1991

[30] Foreign Application Priority Data

Nov. 10, 1990 [DE] Fed. Rep. of Germany ....... 4035838

[51] Int. Cl.⁵ .......................................... F16K 11/074
[52] U.S. Cl. .................. 137/625.46; 137/597
[58] Field of Search ................. 137/597, 625.46, 876, 137/625.41; 251/304, 355

[56] References Cited

U.S. PATENT DOCUMENTS

| 3,385,321 | 5/1968 | Ehrens et al. | 137/625.46 |
| 4,414,883 | 11/1983 | Dauvergne | 137/625.21 X |

FOREIGN PATENT DOCUMENTS

| 0079535 | 11/1982 | European Pat. Off. | 137/625.46 |
| 2803663 | 8/1979 | Fed. Rep. of Germany | 137/625.41 |
| 2841998 | 4/1980 | Fed. Rep. of Germany | |
| 3128968 | 2/1983 | Fed. Rep. of Germany | 137/625.46 |

Primary Examiner—Gerald A. Michalsky
Attorney, Agent, or Firm—Herbert Dubno; Andrew Wilford

[57] ABSTRACT

A switchover valve has a housing having an axis, a generally circular valve plate, and a generally circular control plate. The valve plate is fixed in the housing centered on the axis, has an inner face, and is formed with an outlet port and an inlet port both opening at the face. The ports are radially offset from the axis and angularly equispaced from each other. The control plate is rotatable about the axis in the housing, has an inner face flatly sealingly engaging the valve-plate face, and is formed offset from the axis with a crossflow pocket opening at the face. Thus the control plate is movable angularly about the axis between a crossflow position with the pocket overlying and forming a fluid-flow connection between the inlet port and the outlet port and a blocking position with the pocket wholly angularly offset from at least one of the ports and thereby preventing flow between the ports.

7 Claims, 6 Drawing Sheets

SWITCHOVER VALVE

FIELD OF THE INVENTION

The present invention relates to a valve. More particularly this invention concerns a valve used to switch a source of pressurized fluid from one outlet to another.

BACKGROUND OF THE INVENTION

A switchover valve of the type used to connect the output of a mixing valve either to an overhead shower or to a tub faucet is described in German patent document 2,841,998 issued 27 Sept. 1978 to Andreas Ruth et al. Here the valve elements are a circular ceramic valve plate fixed in the valve housing and formed with a pressurized inlet port and a plurality of outlet ports, with the inlet port centered on the axis and the outlet ports spaced angularly about the axis. A circular ceramic control plate lies flat atop this disk and has a central hole in permanent alignment with the inlet port and an outfeed hole connected to it that can be aligned by rotation of the control plate with any of the outlet ports. Thus when the outfeed hole is aligned with one of the outlet ports it connects it to the pressurized inlet port, and in at least one position of the valve the outfeed hole is between outlet ports and blocked so that there is no fluid flow through the valve.

The main disadvantage of this type of valve is that it is fairly bulky. The diameters of the control and valve plates must be large enough to accommodate the various ports so that the resultant structure is too large to be accommodated to today's architectural styles demanding slim shapes in plumbing fittings.

OBJECTS OF THE INVENTION

It is therefore an object of the present invention to provide an improved valve.

Another object is the provision of such an improved valve which overcomes the above-given disadvantages, that is which is of the above-described ceramic-disk type but that is still of fairly reduced diameter.

SUMMARY OF THE INVENTION

A switchover valve according to this invention has a housing having an axis, a generally circular valve plate, and a generally circular control plate. The valve plate is fixed in the housing centered on the axis, has an inner face, and is formed with an outlet port and an inlet port both opening at the face. The ports are radially offset from the axis and angularly equispaced from each other. The control plate is rotatable about the axis in the housing, has an inner face flatly sealingly engaging the valve-plate face, and is formed offset from the axis with a crossflow pocket opening at the face. Thus the control plate is movable angularly about the axis between a crossflow position with the pocket overlying and forming a fluid-flow connection between the inlet port and the outlet port and a blocking position with the pocket wholly angularly offset from at least one of the ports and thereby preventing flow between the ports.

Thus with this arrangement it is possible for the entire valve core to be relatively slim. It can therefore be designed as a cartridge for a line of designer-type fittings of attractive appearance.

According to further features of the invention the valve plate is formed with two such outlet ports flanking the inlet port and the control plate is movable between two such crossflow positions respectively coupling the outlet ports to the inlet port. In addition the control plate is formed with two such crossflow pockets. The ports and pocket are all formed as circle segments generally centered on the axis and the control plate is formed with a blocking web between the pockets. Thus the control plate is movable from a central position with the blocking web blocking the inlet port between one end position with the one pocket connecting the inlet port with one of the outlet ports and an opposite end position with the other pocket connecting the inlet port with the other outlet port.

In accordance with further features of the invention the valve plate is formed between the outlet ports with a web of generally uniform angular width and extending substantially radially of the axis. This causes a triangular passage to open up between the circularly segmental ports and pockets as the valve is open for accurate flow control.

The valve further has according to the invention an actuating member rotatable about the axis in the housing and provided with formations coupling it rotationally to the control plate. This actuating member is formed at the axis with a polygonal-section recess adapted to receive a valve-operating handle. The housing includes a cup-shaped outer wall formed unitarily with an end wall having a central hole through which the actuating member extends and has an opposite end wall on which the valve plate sits.

BRIEF DESCRIPTION OF THE DRAWING

The above and other objects, features, and advantages will become more readily apparent from the following, reference being made to the accompanying drawing in which.

SPECIFIC DESCRIPTION

Figure 1:
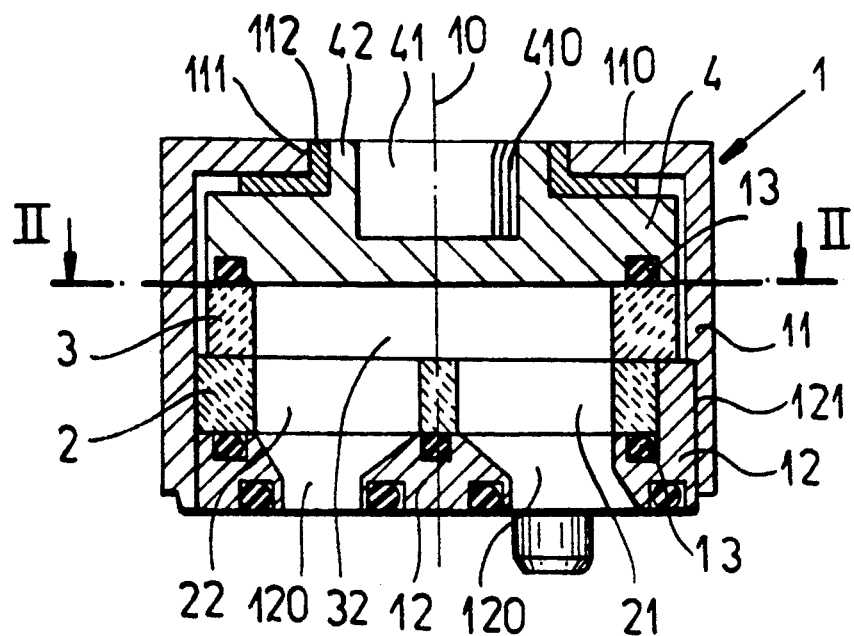
FIG. 1 is an axial section through a cartridge of a valve according to the invention in a fully open position.

As seen in FIGS. 1 through 8 a valve according to this invention basically comprises a housing 1, a valve plate 2, and a control plate 3, all centered on an axis 10. An actuating member 4 sits atop the valve plate 3 and in effect forms a part of it.

The housing 1 has a tubularly cylindrical outer wall 11 centered on the axis and a top end formed with an inwardly projecting shoulder or rim 110 defining an opening 111. A T-section slide ring 112 is fitted within and can rotate in the opening 111. A lower end of the wall 11 receives a floor disk or plate 12 that is provided with three axially upwardly projecting ribs 121 received in radially inwardly open grooves of the wall 11 to lock it rotationally in place. This plate 12 is formed with three axially throughgoing passages 120 angularly spaced about the axis 10 and adapted to be connected in this arrangement to a pressurizable incoming line emanating from a mixing valve, a line leading to a faucet, and a line leading to a shower.

Figure 5:
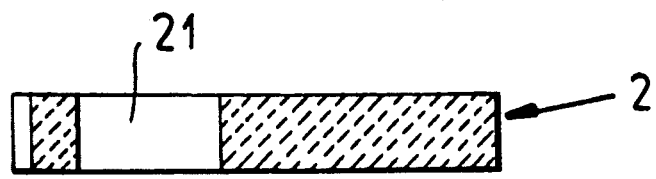
FIG. 5 is an axial section through the valve plate according to the invention.
Figure 6:
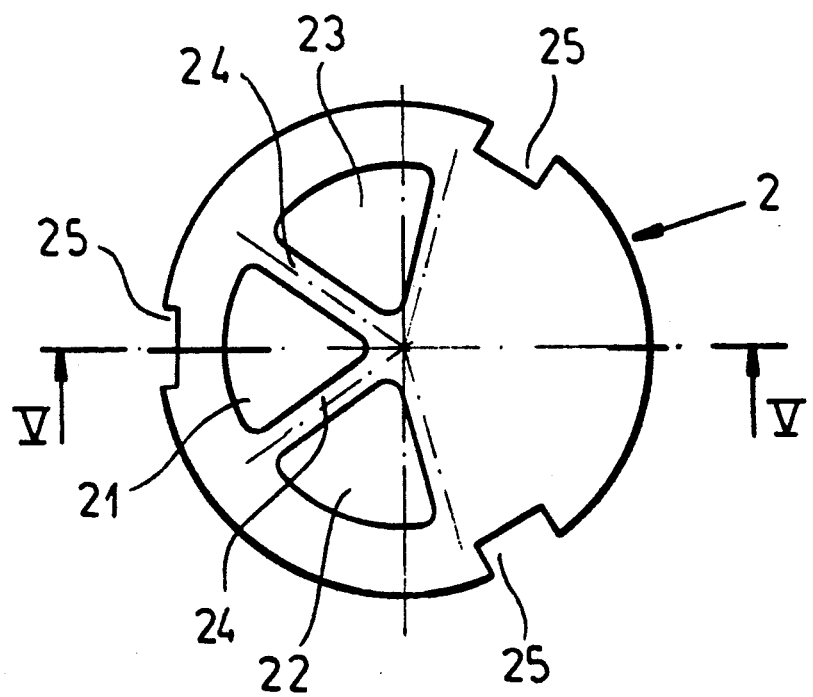
FIG. 6 is a top view of the plate of FIG. 5, line V—V of FIG. 6 being the section line for FIG. 5.

The valve plate 2 as seen best in FIGS. 5 and 6 is formed with three triangular throughgoing ports 21, 22 and 23. The port 21 is aligned with the center passage 120 of the plate 12 and forms an outlet port and the ports 22 and 23 angularly flank the port 21 and are separated from it by sealing webs 24. The plate 2 is formed on its outer periphery with radially outwardly open notches 25 that fit over the ribs 121 to rotationally lock the plate 2 in the housing 1. Seal rings 13 are provided around the ports 12 engaging the bottom face of the plate 2.

Figure 7:
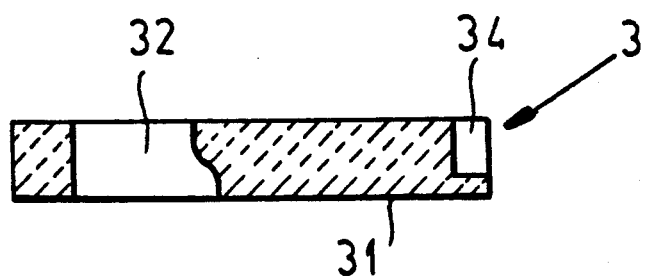
FIG. 7 is an axial section through the control plate according to the invention.
Figure 8:
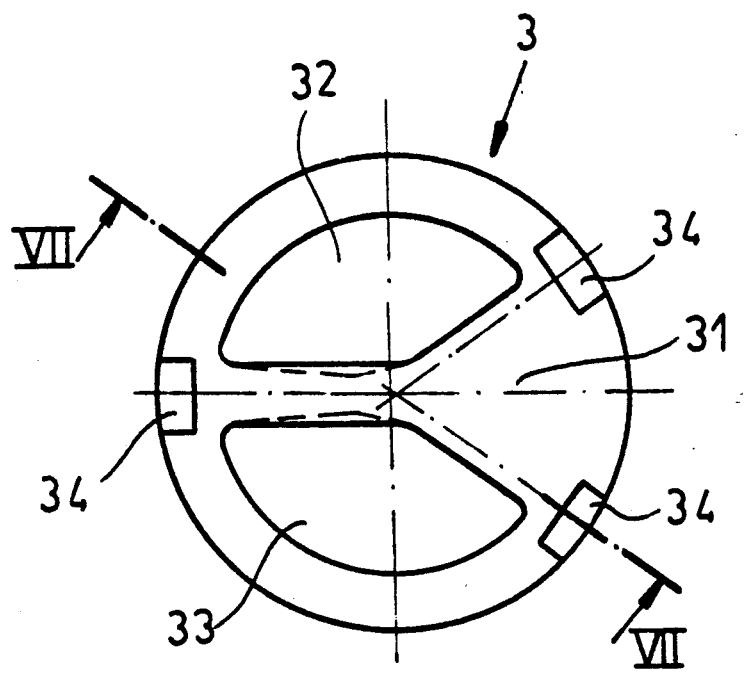
FIG. 8 is a top view of the plate of FIG. 7, line VII—VII of FIG. 8 being the section line for FIG. 7.

The control disk 3 as seen in FIGS. 7 and 8 is formed with a pair of part-circular crossflow pockets 32 and 33 flanking a blocking part 31 that is of an angular dimension sufficient to overlie and completely block the port 21. The pockets 32 and 33 are, however, large enough that they can each completely cover the respective port 22 or 23 and the port 21. The actuating member 4 fits with lugs 43 in notches 34 formed in the outer or top face of the plate 3 to rotationally link these two elements 3 and 4 and this actuating member 4 has a collar 42 projecting through the opening 111 and formed with a recess 41 with ridges 410 for coupling to a valve-actuating handle. The top of the element 4 rides on the glide ring 112 and seals 13 are provided on the bottom of the element 4 to seal around the pockets 32 and 33 which are in effect axially upwardly closed by the part 4.

Figure 9:
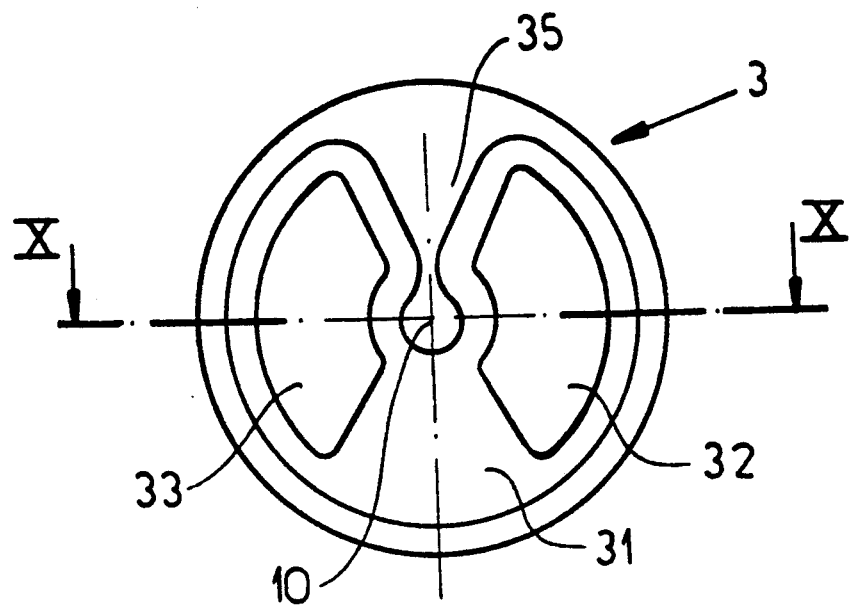
FIG. 9 is a top view of another control plate according to the invention.
Figure 10:
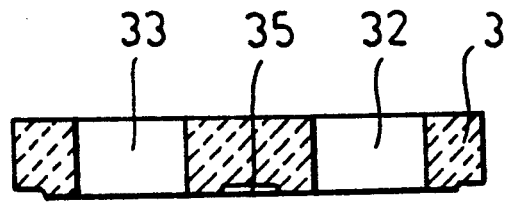
FIG. 10 is a section taken along line X—X of FIG. 9.

It is also possible as seen in FIG. 9 for a valve plate 3' to have between the pockets 32 and 33 a lubricant-reservoir pocket 35 that extends all the way to the axis 10. When the plates 2 and 3 are ceramic, such lubricant can greatly ease operation of the valve.

Figure 2:
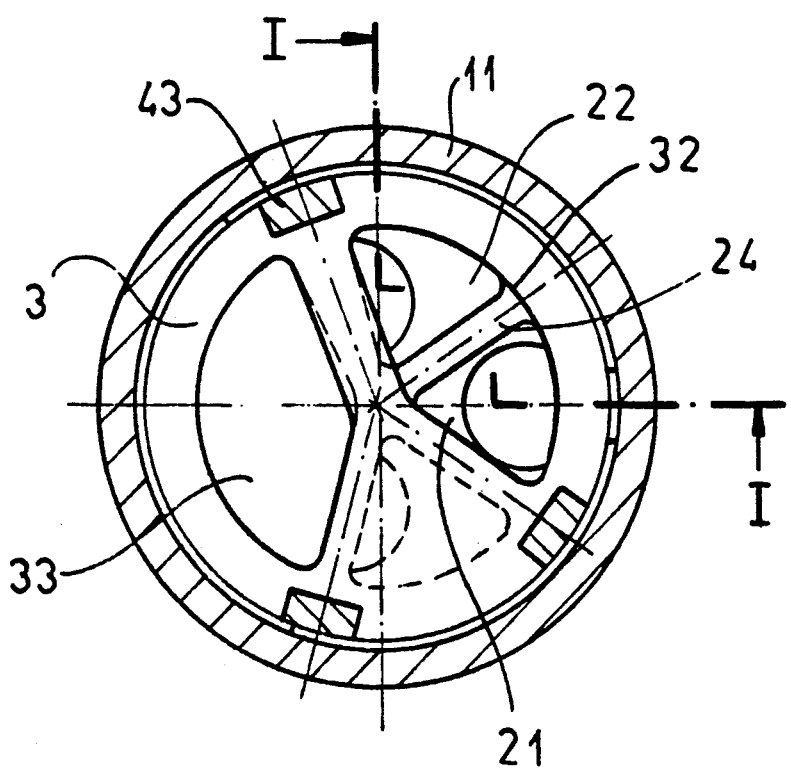
FIG. 2 is a section taken along line II—II of FIG. 1, line I—I of FIG. 2 being the section line for FIG. 1.
Figure 3:
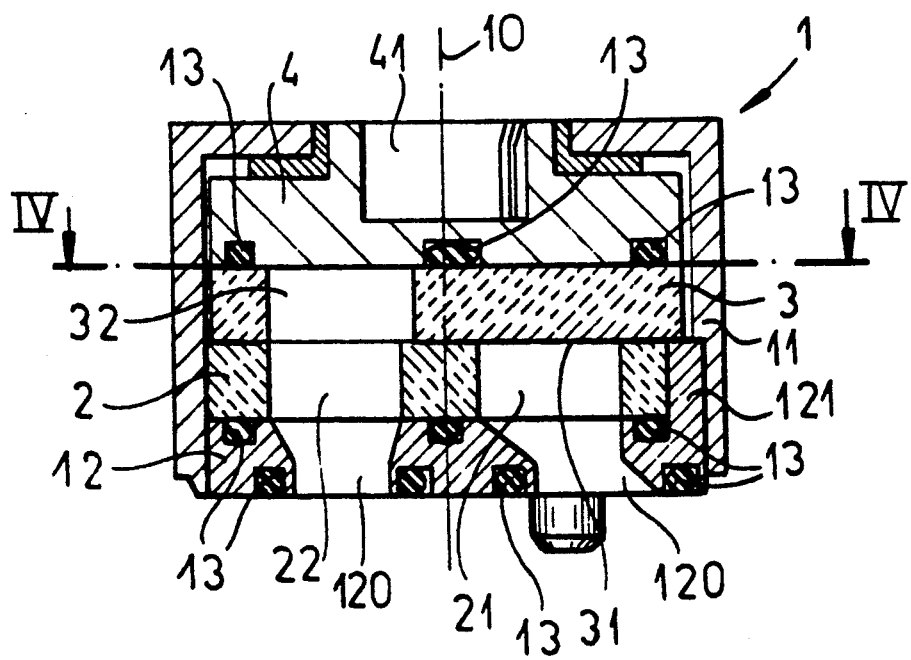
FIG. 3 is an axial section through the valve cartridge in the closed position.
Figure 4:
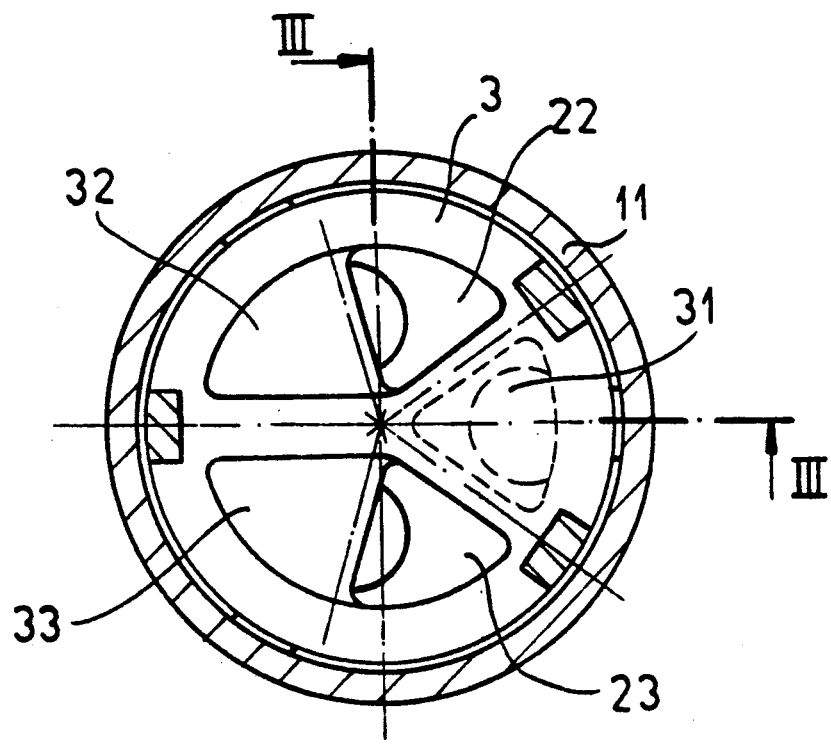
FIG. 4 is a section taken along line IV—IV of FIG. 3, line III—III of FIG. 4 being the section line for FIG. 3.
Figure 11:
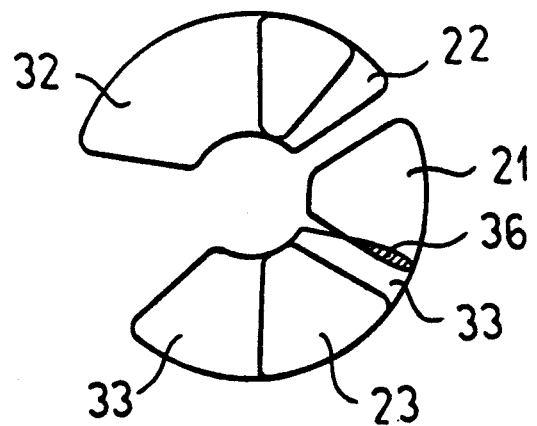
FIGS. 11, 12, and 13 are schematic views illustrating elements of the valves in various different positions.
Figure 12:
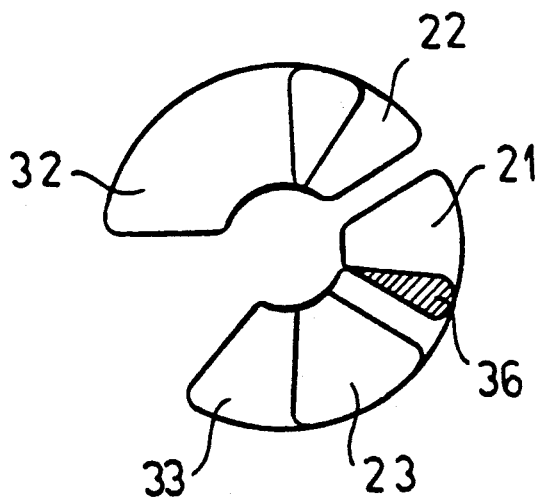
Figure 13:
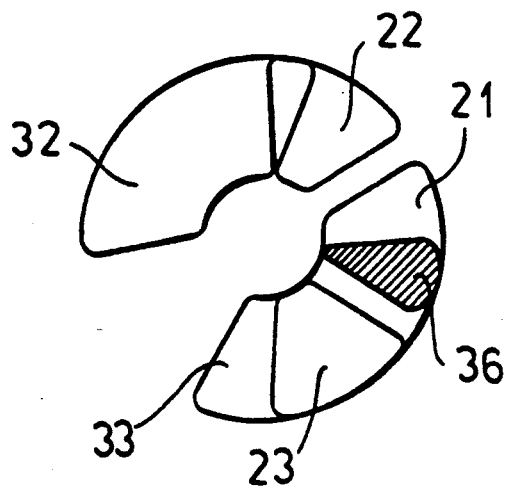

This valve is therefore displaceable from a central position shown in FIGS. 3 and 4 with the blocking part 31 overlying and blocking flow out of the inlet port 21, and two end positions one of which is shown in FIGS. 1 and 2 and in which the inlet port 21 is connected via one of the pockets 32 Or 33 to the respective outlet port 22 or 23. As can be seen in FIG. 11 when the control plate 3 is moved 15° off the fully closed position there is a tiny triangular overlap region 36 between the port 21 and the pocket 33 for limited flow from the port 21 to the port 23. Further displacement to 25° creates the situation of FIG. 12 and further displacement to 35° to the FIG. 13 position. As can be seen the passage 36 is triangular so that it can control flow very accurately and can stop flow smoothly and neatly. There will be no hammer on opening or closing due to the triangular overlap of the pockets and ports.

We claim:

1. A switchover valve comprising:
    a housing having an axis;
    a generally circular valve plate fixed in the housing centered on the axis, having an inner face, and formed offset from the axis with a pair of outlet ports opening at the face and an inlet port lying angularly between the outlet ports and also opening at the face, the ports being radially offset from the axis; and
    a generally circular control plate rotatable about the axis in the housing, having an inner face flatly sealingly engaging the valve-plate face, and formed offset from the axis with a pair of angularly spaced crossflow pockets opening at the face and formed between the crossflow pockets with a flat blocking part of an area greater than that of the outlet port, the control plate being movable angularly about the axis between a pair of angularly offset crossflow positions with the respective pockets overlying and forming a fluid-flow connection between the inlet port and the respective outlet ports and a blocking position with the blocking part wholly overlying the inlet port and preventing flow between the inlet and outlet ports.

2. The switchover valve define din claim 1 wherein the ports and pocket are all formed as circle segments generally centered on the axis.

3. The switchover valve defined in claim 1 wherein the control-plate inner face is formed with a lubricant-filled pocket.

4. The switchover valve defined in claim 1 wherein the valve plate is formed between the outlet ports with a web of generally uniform angular width and extending substantially radially of the axis.

5. The switchover valve defined i claim 1, further comprising
    an actuating member rotatable about the axis in the housing and provided with formations coupling it rotationally to the control plate.

6. The switchover valve defined in claim 5 wherein the actuating member is formed at the axis with a polygonal-section recess adapted to receive a valve-operating handle.

7. The switchover valve defined in claim 5 wherein the housing includes a cup-shaped outer wall formed unitarily with an end wall having a central hole through which the actuating member extends and having an opposite end wall on which the valve plate sits.

* * * * *